US008238283B2

(12) United States Patent
Kwon

(10) Patent No.: US 8,238,283 B2
(45) Date of Patent: Aug. 7, 2012

(54) METHOD AND APPARATUS FOR TRANSMITTING MESSAGES IN PORTABLE TERMINAL

(75) Inventor: Hae Moon Kwon, Ansan-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 356 days.

(21) Appl. No.: 12/477,431

(22) Filed: Jun. 3, 2009

(65) Prior Publication Data

US 2009/0296623 A1 Dec. 3, 2009

(30) Foreign Application Priority Data

Jun. 3, 2008 (KR) ........................ 10-2008-0051974

(51) Int. Cl.
*H04H 20/71* (2008.01)
*H04W 4/06* (2009.01)
*H04W 4/12* (2009.01)

(52) U.S. Cl. .................................. 370/312; 379/216.01
(58) Field of Classification Search .................. None
See application file for complete search history.

(56) References Cited

U.S. PATENT DOCUMENTS

| | | | | |
|---|---|---|---|---|
| 6,208,872 | B1* | 3/2001 | Schmidt | 455/518 |
| 7,551,899 | B1* | 6/2009 | Nicolas et al. | 455/73 |
| 2001/0046064 | A1* | 11/2001 | Kulakowski et al. | 358/1.15 |
| 2003/0152205 | A1* | 8/2003 | Winkler | 379/142.06 |
| 2003/0169861 | A1* | 9/2003 | Misumi | 379/93.23 |
| 2003/0174833 | A1* | 9/2003 | Wang | 379/419 |
| 2005/0185784 | A1* | 8/2005 | Chiu et al. | 379/210.02 |
| 2008/0043972 | A1* | 2/2008 | Ruetschi et al. | 379/216.01 |
| 2008/0159181 | A1* | 7/2008 | Anderson | 370/271 |
| 2009/0131107 | A1* | 5/2009 | Sasaki | 455/556.2 |
| 2010/0067678 | A1* | 3/2010 | Bedingfield, Sr. | 379/142.06 |

FOREIGN PATENT DOCUMENTS

| KR | 10-2006-0057375 A | 5/2006 |
|---|---|---|
| KR | 10-2006-0108140 A | 10/2006 |
| KR | 10-0688293 B1 | 2/2007 |

* cited by examiner

*Primary Examiner* — Min Jung
(74) *Attorney, Agent, or Firm* — Jefferson IP Law, LLP

(57) ABSTRACT

A method and apparatus adapted to a portable terminal for generating a multicast group and multicasting messages using the multicast group are provided. The method includes inputting a number to be used as a multicast number, searching in a phone book for phone numbers matching with the input number, selecting at least two phone numbers matching with the input number, and generating a multicast group. Portable terminal users can more easily and efficiently send the message to recipients.

18 Claims, 8 Drawing Sheets

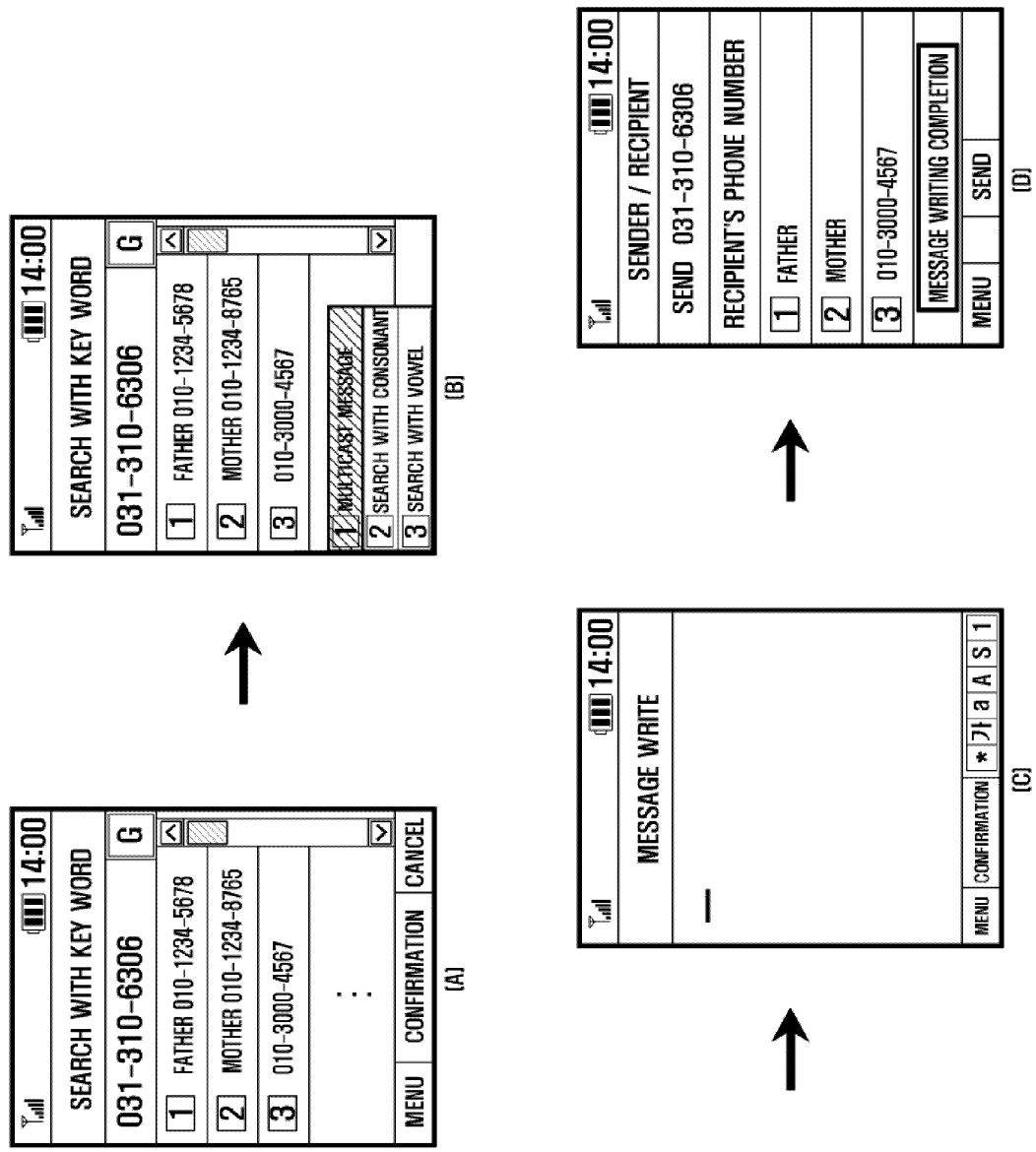

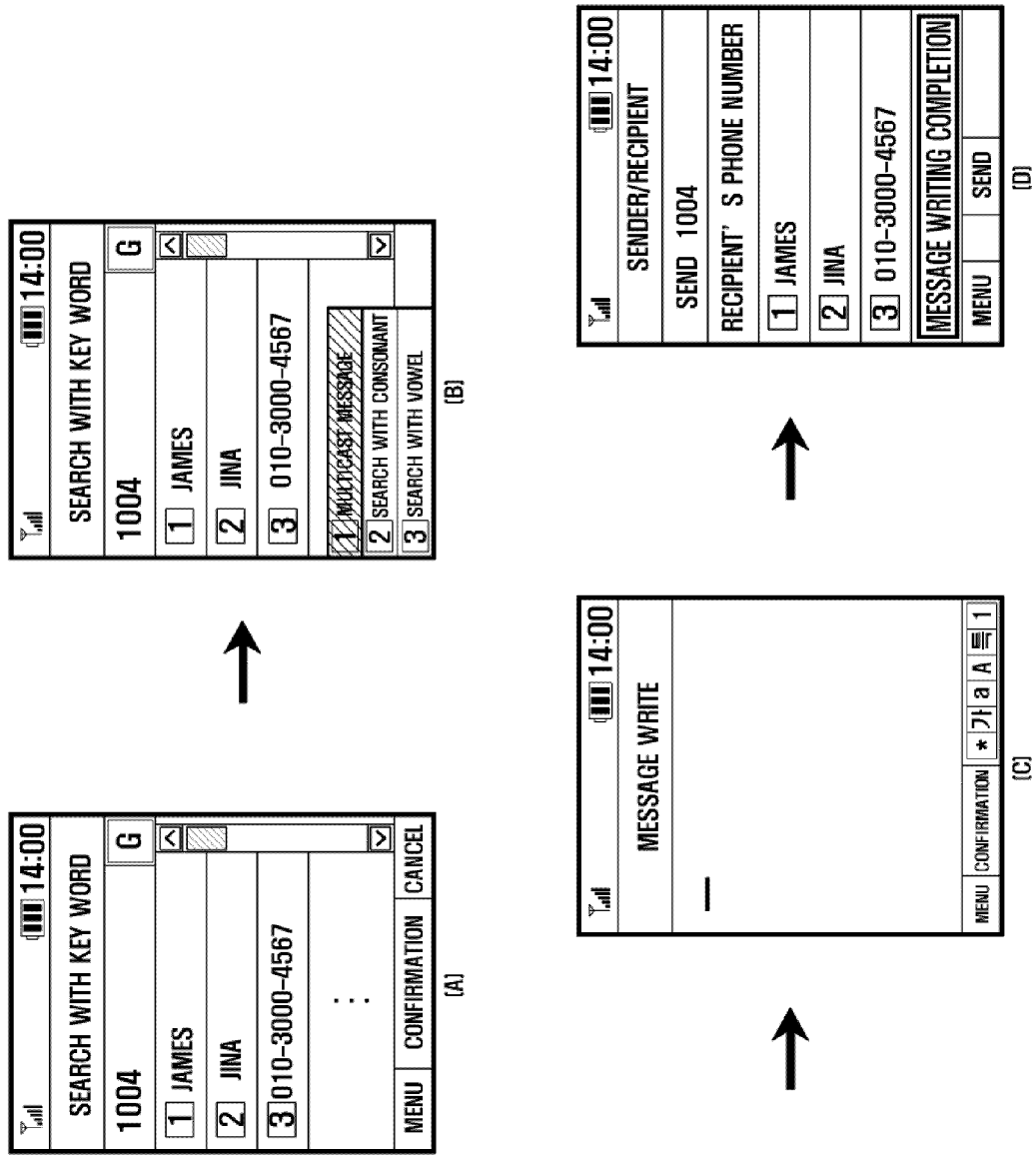

METHOD AND APPARATUS FOR TRANSMITTING MESSAGES IN PORTABLE TERMINAL

PRIORITY

This application claims the benefit under 35 U.S.C. §119 (a) of a Korean patent application filed in the Korean Intellectual Property Office on Jun. 3, 2008 and assigned Serial No. 10-2008-0051974, the entire disclosure of which is hereby incorporated by reference.

BACKGROUND OF THE INVENTION

1. Field of the Invention

The present invention relates to portable terminals. More particularly, the present invention relates to a method and apparatus that generates a multicast group using a phone book and multicasts messages using the multicast group.

2. Description of the Related Art

Portable terminals provide users with convenient portability. They can store a variety of application programs and a plurality of play-back files. In addition, since they have additional applicability, they are employed in various areas.

More particularly, a message service for portable terminals can be effective, although the portable terminals are located in out of service coverage area. In addition, such a message service can be also effective to transmit a simple message.

A conventional message service may be a Short Message Service (SMS) where a short text message of up to 80 bytes can be transmitted and a Multimedia Message Service (MMS) where a text message attaching at least one of a picture and moving images can be transmitted. Such a message service allows a single caller to multicast the same message to a plurality of recipients, simultaneously.

However, the conventional message service is disadvantageous in that, when a user multicasts a message using his/her portable terminal, he/she must directly and respectively input recipients' phone numbers. Although the conventional message service allows a user to use a multicast number, it is still disadvantageous in that the user must subscribe to a communication service company providing a multicast number service in order to acquire a corresponding number and make a call to the company to designate recipients.

SUMMARY OF THE INVENTION

An aspect of the present invention is to address at least the above-mentioned problems and/or disadvantages and to provide at least the advantages described below. Accordingly, an aspect of the present invention is to provide a method and apparatus that can multicast a message in a portable terminal, using one of a wired phone number and a number set by a user.

In accordance with an aspect of the present invention, a method for generating a multicast group in a portable terminal is provided. The method includes inputting a number to be used as a multicast number, searching in a phone book for phone numbers matching with the input number, selecting at least two phone numbers matching with the input number, and generating a multicast group.

In accordance with another aspect of the present invention, a method for multicasting a message in a portable terminal is provided. The method includes inputting a number for message transmission, comparing the input number with a multicast number previously stored in a phone book, and multicasting a message to recipients' numbers corresponding to a multicast group of the multicast number.

In accordance with another aspect of the present invention, a portable terminal for generating a multicast group and multicasts a message is provided. The portable terminal includes an input unit for inputting a number to be used as a multicast number, and a controller for searching for phone numbers matching with the input number in a phone book of the portable terminal, for selecting at least two of the phone numbers, and for generating a multicast group with the selected phone numbers.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which:

FIG. 7A to FIG. 7D are views illustrating screens describing a method for multicasting a message using a representative number according to an exemplary embodiment of the present invention; and FIG. 8A to FIG. 8D are views illustrating screens describing a method for multicasting a message using a designated number according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following descriptions, a portable terminal according to exemplary embodiments of the present invention can generate a multicast group and multicast a message to recipients in the multicast group if the recipients are selected through a recipient input field. It will be appreciated that the portable terminal can be applied to any information communication device, multimedia device, and their applications, such as, a Personal Digital Assistant (PDA), a Code Division Multiple Access (CDMA) terminal, a Wideband Code Division Multiple Access (WCDMA) terminal, a Global System for Mobile communication (GSM) terminal, an International Mobile Telecommunication 2000 (IMT-2000) terminal, a smart phone, a Universal Mobile Telecommunication Service (UMTS) terminal, a laptop computer, a personal computer, and the like.

A multicast number refers to a number to multicast a message to recipients included in a multicast group. An example of the multicast number is a representative number corresponding to a wired phone number, a number set by a user, etc. For example, a representative number may be a wired phone number, such as 031-310-6306, etc. and a designated number is a number, such as 1004, etc.

A multicast group refers to a recipient group including only recipients corresponding to a multicast number, which is searched from recipients stored in a phone book, in order to multicast a message.

Figure 1:
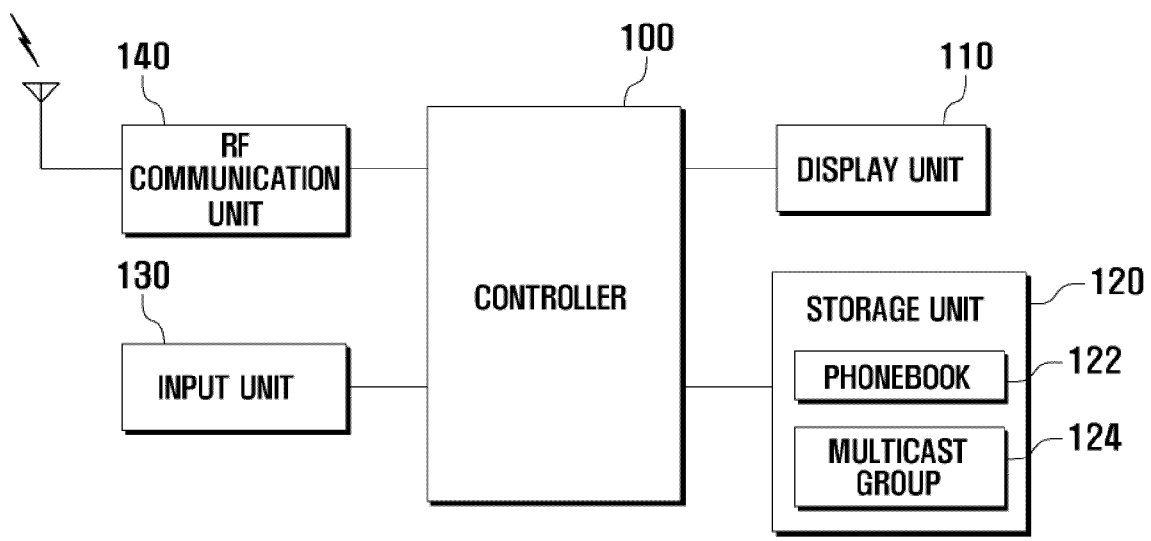
FIG. 1 is a view illustrating a portable terminal according to an exemplary embodiment of the present invention.

FIG. 1 is a view illustrating a portable terminal according to an exemplary embodiment of the present invention.

Referring to FIG. 1, the portable terminal includes a controller 100, a display unit 110, a storage unit 120, an input unit 130, and an RF communication unit 140. The storage unit 120 includes a phone book 122 and a multicast group 124.

The display 110 displays a variety of menus of the portable terminal 100, information input by a user, and information provided to the user. For example, the display unit 110 displays processes of generating the multicast group 124 and multicasting a message on its screen. The display 110 is implemented by display devices, such as a Liquid Crystal Display (LCD) and an Organic Light Emitting Diode (OLED). If the LCD is implemented as a touch screen, the display unit 110 may also serve as an input means, such as the input unit 130.

The storage unit 120 stores application programs related to operations of the phone book 122 and the multicast group 124. The storage unit 120 may include a program area and a data area.

The program area stores an Operating System (OS) for booting the portable terminal 100, an application program for multicasting a message, and a program for allowing a user to write a message. The data area stores data generated as the portable terminal 100 is operated. More particularly, the data area according to an exemplary embodiment of the present invention stores a phone book 122, a multicast group 124, pictures or moving images captured by a camera of the portable terminal, audio data, contents data, and the like.

The phone book 122 includes fields such as a name, a phone number, an email address, a picture, an address, a birth date, and the like. The phone number field stores data, such as a wired phone number, a portable terminal phone number, a facsimile number, and the like. The multicast group 124 stores data that is produced in such a way that the controller 100 searches for recipients whose wired phone number or number set by a user matches with numbers stored in the phone book 122 and then sets them as a certain group.

The input unit 130 receives numerical or character information. The input unit 130 includes a plurality of function keys to set a variety of functions, and numerical keys. The function keys include an addition key, direction keys, side keys, etc. More particularly, the function keys include a phone book key and a menu key. The input unit 130 outputs key signals, related to a user's setting and function control of the portable terminal, to the controller 100. The direction keys of the input unit 130 allow the display unit 110 to scroll up and down, if recipients in a multicast group cannot be displayed, at one time, on the display unit 110. Therefore, the direction keys assist the user to search for recipients not displayed on the display unit 110.

The RF communication unit 140 establishes communication channels between the portable terminal 100 and a base station and allows the portable terminal 100 to communicate with other portable terminals to perform a voice call and message multicasting. The RF communication unit 140 includes an RF transmitter (not shown) for up-converting the frequency of transmitted signals and for amplifying the transmitted signals, and an RF receiver (not shown) for low-noise amplifying of received RF signals and for down-converting the frequency of the received RF signals.

The controller 100 controls operations of the portable terminal 100 and the signal flows between blocks in the portable terminal 100. In particular, the controller 100 according to an exemplary embodiment of the present invention can generate a multicast group 124 using a phone book 122 and multicast a message.

The controller 100 compares a number input through the input unit 130 with phone numbers stored in the phone book 122, searches for recipients whose numbers partially or entirely match with the input number, and displays them on the display unit 110. The controller 100 selects recipients from the total recipients, according to a user's input, and then generates a multicast group 124 with the selected recipients. If the input number is a wired phone number, the controller 100 recognizes the multicast number of the multicast group 124 as a representative number and then stores it in the storage unit 120. If the input number is a number set by a user, the controller 100 recognizes the multicast number of the multicast group 124 as a designated number and then stores it in the storage unit 120.

The controller 100 multicasts a message using a multicast number stored in the storage unit 120. The controller 100 determines whether the number, input through the input unit 130, is a multicast number of the multicast group 124, stored in the storage unit 120.

If the input number is a multicast number, the controller 100 activates a message input window for multicasting a message to recipients in the multicast group 124 and then controls the display unit 110 to display the message input window.

When the message input window is activated, the controller 100 detects a message input signal through the input unit 130. The controller 100 may also control the RF communication unit 140 so that the written message can be multicast to recipients in the multicast group 124, through corresponding multicast numbers.

In the following description, a method for generating a multicast group is explained in detail with reference to drawings.

Figure 2:
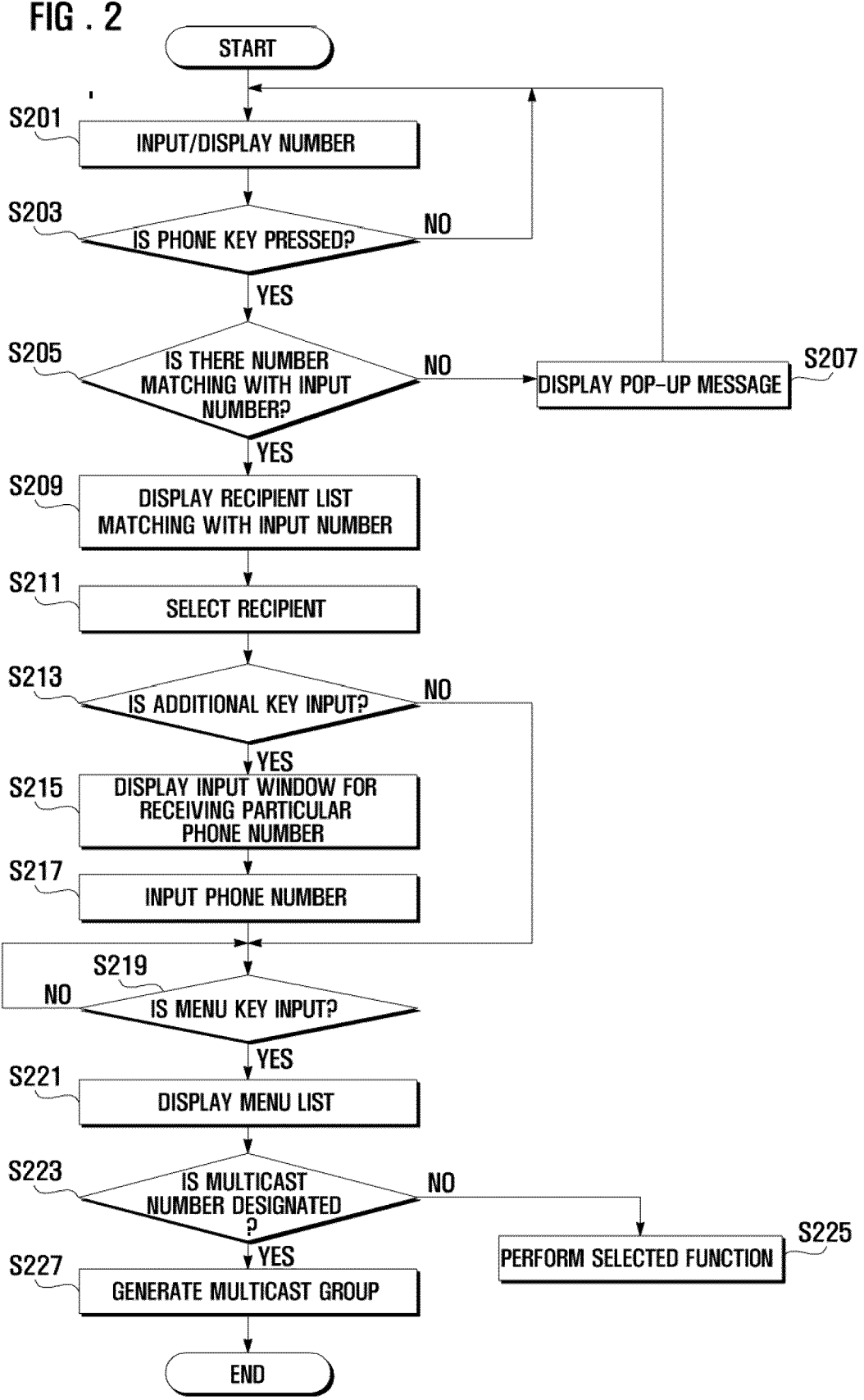
FIG. 2 is a flowchart illustrating a method for generating a multicast group according to an exemplary embodiment of the present invention.
Figure 3:
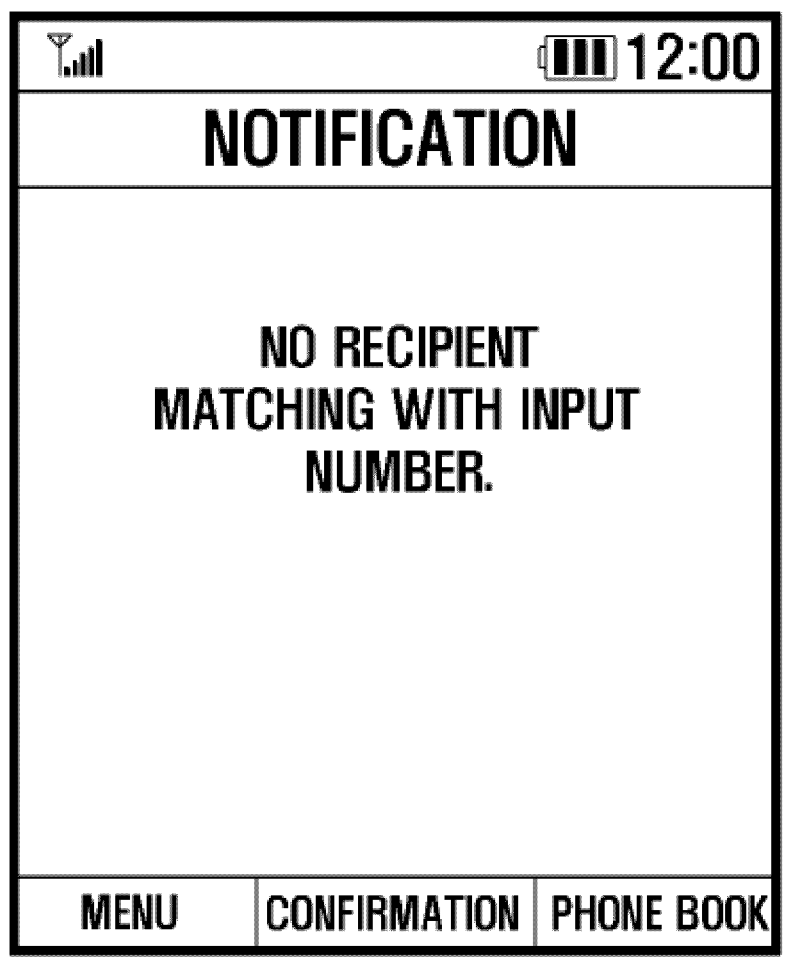
FIG. 3 is a view illustrating a screen describing a method for generating a multicast group according to an exemplary embodiment of the present invention.

FIG. 2 is a flowchart illustrating a method for generating a multicast group according to an exemplary embodiment of the present invention. FIG. 3 is a view illustrating a screen describing a method for generating a multicast group according to an exemplary embodiment of the present invention. FIG. 4A to FIG. 4H are views illustrating screens describing a method for generating a multicast group using a representative number according to an exemplary embodiment of the present invention. FIG. 5A to FIG. 5H are views illustrating screens describing a method for generating a multicast group using a designated number according to an exemplary embodiment of the present invention.

Referring to FIG. 2, FIG. 3, FIG. 4A to FIG. 4H and FIG. 5A to FIG. 5H, the controller 100 receives a number input through the input unit 130 and controls the display unit 110 to display the input number at step S201. The controller 100 may receive a wired phone number or a user's setting number through the input unit 130.

Figure 4:
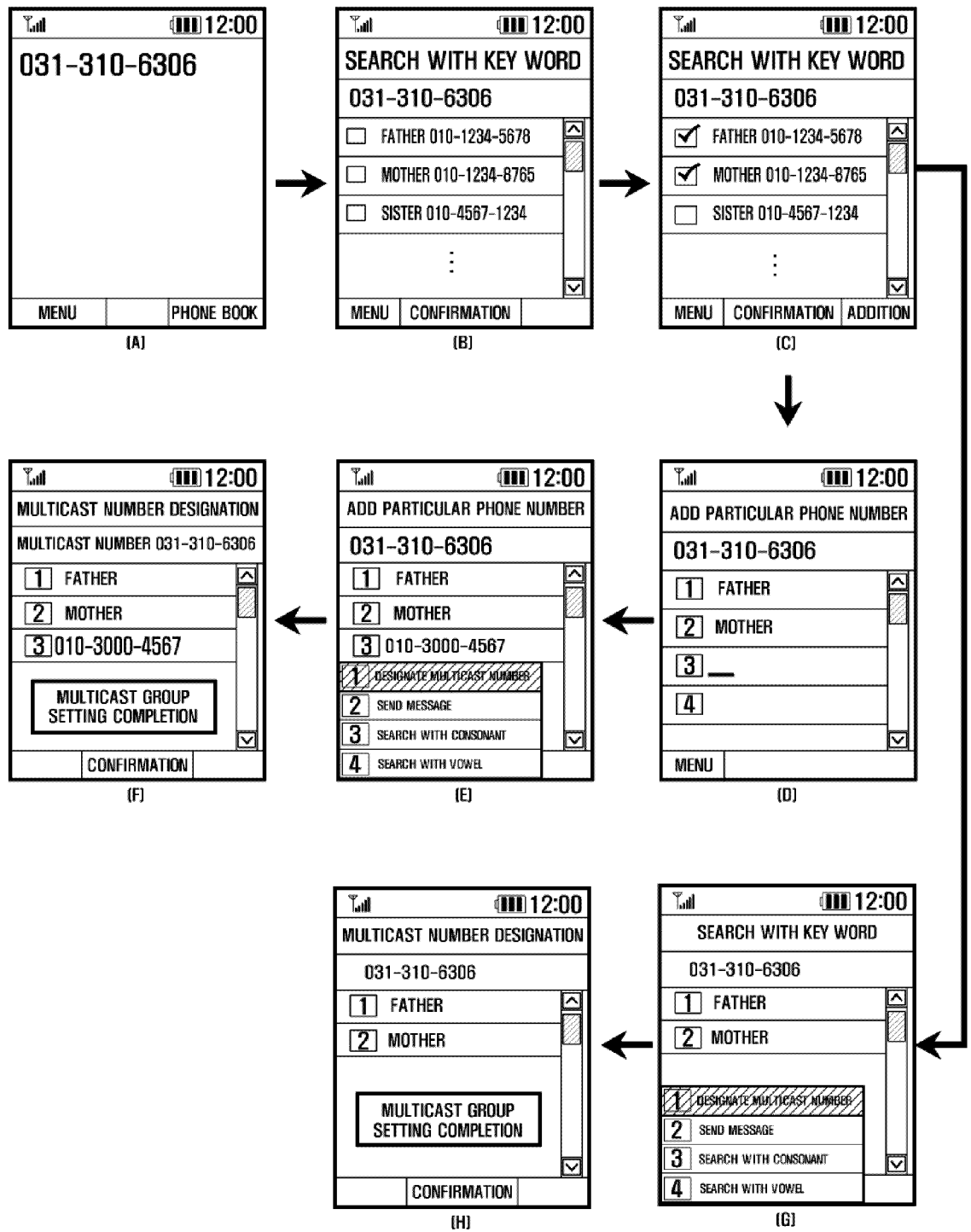
FIG. 4A to FIG. 4H are views illustrating screens describing a method for generating a multicast group using a representative number according to an exemplary embodiment of the present invention.
Figure 5:
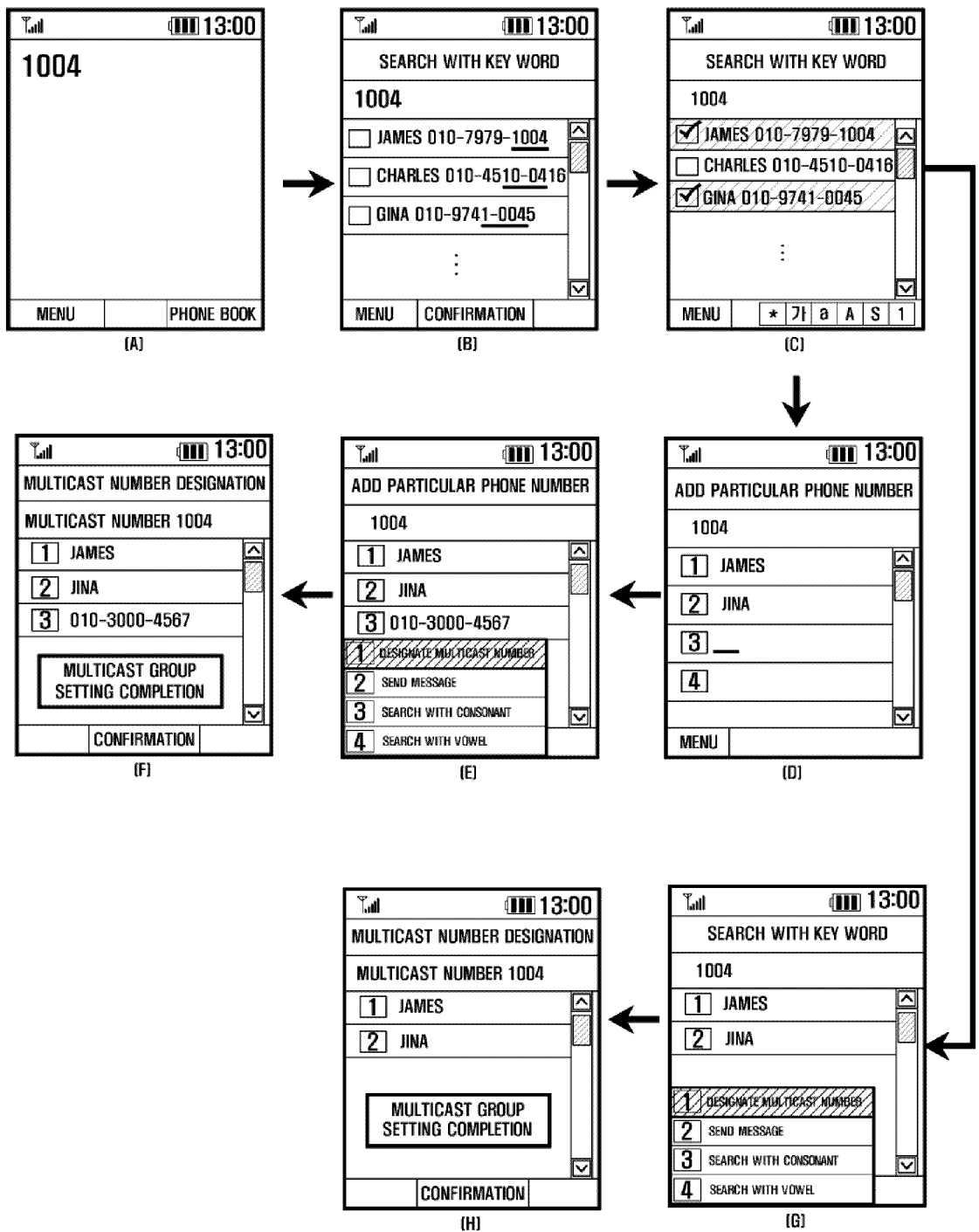
FIG. 5A to FIG. 5H are views illustrating screens describing a method for generating a multicast group using a designated number according to an exemplary embodiment of the present invention.

If the controller 100 receives a wired phone number '031-310-6306' through the input unit 130, it controls the display unit 110 to display it as illustrated in FIG. 4A. In contrast, if the controller 100 receives a user's setting number '1004' through the input unit 130, it controls the display unit 110 to display it as illustrated in FIG. 5A.

Next, the controller 100 determines whether a phone book key is pressed through the input unit 130 at step S203.

If the controller 100 determines that a certain key, for example, a confirmation key or a phone book key, is input through the input unit 130 at step S203, it searches for recipients from the phone book 122 and determines whether the phone book 122 has numbers partially or entirely matched with the input number at step S205.

In contrast, if the controller 100 determines that a phone book key is not input through the input unit 130 at step S203, it returns to step S201 where it detects a number input through the input unit 130.

If the controller 100 determines that the phone book 122 has phone numbers that match with the input number at step S205, it controls the display unit 110 to display the searched recipients in step S209.

For example, if a wired phone number is input through the input unit 130, the controller 100 controls the display unit 110 so that names and portable terminal numbers of recipients in the phone book 122, which match with the input wired phone number, can be displayed, as illustrated in FIG. 4B. That is, the controller 100 searches for recipients whose wired phone numbers match with the input wired phone number 031-310-6306, such as a father 010-1234-5678, a mother 010-1234-8765 and a sister 010-4667-1234, and then displays them on the display unit 110.

In contrast, if a user's setting number is input through the input unit 130, the controller 100 controls the display unit 110 so that names and portable terminal numbers of recipients in the phone book 122, whose numbers partially or entirely match with the input number set by a user, can be displayed, as illustrated in FIG. 5B. That is, the controller 100 searches for recipients, whose portable terminal numbers partially match with the input user's setting number '1004,' such as James, Charles, and Gina, and then displays them on the display unit 110.

If all the recipients cannot be displayed on the display unit 110 at a time at step S209, the controller 100 may control the display unit 110 to show a scroll bar at the right side, so that a user can search for the recipients using the scroll bar.

In contrast, if the controller 100 determines that the phone book 122 does not have a phone number that matches with the input number at step S205, it displays a pop-up message on the screen of the display unit 110 at step S207, and returns to step S201. For example, as illustrated in FIG. 3, the controller 100 controls the display unit 110 to display a message on the screen, showing "no recipient matching with the input number."

Next, the controller 100 receives an input signal through the input unit 130, in order to select recipients from the displayed recipients and include them in a certain multicast group 124 at step S211.

The controller 100 detects input signals for selecting recipients and including them in a multicast group 124 as at least one of the numerical key and the direction key is pressed through the input unit 130 at step S211.

If a wired phone number is input through the input unit 130, the controller 100 controls the display unit 110 to display phone numbers of recipients searched for from the phone book 122 at step S211. For example, if the controller 100 detects an input signal regarding recipients to be included in a multicast group 124, such as a father and a mother, it controls the display unit 110 to display them on the screen as illustrated in FIG. 4C.

If a user's setting number is input through the input unit 130, the controller 100 controls the display unit 110 to display phone numbers of recipients searched for from the phone book 122 at step S211. For example, if the controller 100 detects an input signal regarding recipients to be included in a multicast group 124, such as Charles and Gina, it controls the display unit 110 to display them on the screen as illustrated in FIG. 5C.

The controller 100 determines whether an additional key of the input unit 130 is pressed to input a certain phone number to be included in a multicast group 124 at step S213. If the controller 100 determines that an additional key is pressed at step S213, it activates an input window for receiving a certain phone number and controls the display unit 110 to display it at step S215.

If the controller 100 receives a wired phone number through the input unit 130, it controls the display unit 110 to display it as illustrated in FIG. 4D. The controller 100 displays recipients, for example, a father and a mother, to be included in a multicast group 124 whose multicast number is '031-310-6306' and activates an input window that receives a certain phone number to be added to the multicast group 124.

If the controller 100 receives a user's setting number through the input unit 130, it controls the display unit 110 to display it as illustrated in FIG. 5D. The controller 100 displays recipients, for example, James and Gina, to be included in a multicast group 124 whose multicast number is '1004' set by a user, and activates an input window that receives a certain phone number to be added to the multicast group 124.

If a certain phone number to be included in a multicast group 124 is input at step S217, the controller 100 determines whether a menu key of the input unit 130 for designating a multicast number of the multicast group 124 is input at step S219. If the controller 100 determines that the menu key is input at step S219, it controls the display unit 110 to display a menu list at step S221.

If a wired phone number is input through the input unit 130, the controller 100 controls the display unit 110 to display a menu list that assists a user to designate the wired phone number as a multicast number. For example, as illustrated in FIG. 4E, if the controller 100 detects that a menu key is input through the input unit 130, it controls the display unit 110 to display the menu list of '1 designate multicast number,' '2 send message,' '3 search with consonant,' and '4 search with vowel.'

If a user's setting number is input through the input unit 130, the controller 100 controls the display unit 110 to display a menu list that assists a user to designate the user's setting number as a multicast number. For example, as illustrated in FIG. 5E, if the controller 100 detects that a menu key is input through the input unit 130, it controls the display unit 110 to display the menu list of '1 designate multicast number,' '2 send message,' '3 search with consonant,' and '4 search with vowel.'

The controller 100 determines whether a signal for selecting '1 designate multicast number' is input through the input unit 130 at step S223. The controller 100 can detect the input signal for selecting '1 designate multicast number' through the operation of the direction keys or the numerical keys of the input unit 130. If the controller 100 determines that the signal other than the signal for selecting '1 designate multicast number' is input at step S223, it performs a corresponding function at step S225.

In contrast, if the controller 100 determines that a signal for selecting '1 designate multicast number' is input at step S223, it generates a multicast group 124 with a multicast number that is based on the number input through the input unit 130 and a certain phone number at step S227. For example, if a wired phone number is input through the input unit 130, the controller 100 controls the display unit 110 to display a screen as illustrated in FIG. 4F. If a user's setting number is input, the controller 100 controls the display unit 110 to display a screen as illustrated in FIG. 5F.

Referring back to step S213, if the controller 100 determines that an additional key for inputting a certain phone number to be included in a multicast group 124 is not pressed at step S213, it proceeds to step S219 where a multicast number is designated.

The controller 100 determines whether a menu key for designating a multicast number of the multicast group 124 is pressed through the input unit 130 at step S219. If the controller 100 determines that the menu key is input at step S219, it controls the display unit 110 to display a menu list at step S221.

If a wired phone number is input through the input unit 130, the controller 100 controls the display unit 110 to display a menu list that assists a user to designate the wired phone number as a multicast number. For example, as illustrated in FIG. 4G, if the controller 100 detects that a menu key is input it controls the display unit 110 to display the menu list of '1 designate multicast number,' '2 send message,' '3 search with consonant,' and '4 search with vowel.'

If a user's setting number is input through the input unit 130, the controller 100 controls the display unit 110 to display a menu list that assists a user to designate the user's setting number as a multicast number. For example, as illustrated in FIG. 5G, if the controller 100 detects that a menu key is input, it controls the display unit 110 to display the menu list of '1 designate multicast number,' '2 send message,' '3 search with consonant,' and '4 search with vowel.'

The controller 100 determines whether a signal for selecting '1 designate multicast number' is input through the input unit 130 at step S223. The controller 100 can designate the input number as a multicast number and store it. The controller 100 can detect the input of the signal for selecting '1 designate multicast number' through the operation of the direction keys or the numerical keys of the input unit 130. If the controller 100 determines that the signal other than the signal for selecting '1 designate multicast number' is input at step S223, it performs a corresponding function at step S225.

Next, the controller 100 generates a multicast group 124 with a multicast number that is based on the number input through the input unit 130 at step S227. For example, if a wired phone number is input through the input unit 130, the controller 100 controls the display unit 110 to display a screen as illustrated in FIG. 4G. If a user's setting number is input, the controller 100 controls the display unit 110 to display a screen as illustrated in FIG. 5G.

If a wired phone number is input through the input unit 130, the controller 100 recognizes it as a representative number and stores it in the storage unit 120. The controller 100 can use the representative number as a multicast number for the multicast group in order to multicast a message. If a user's setting number is input through the input unit 130, the controller 100 recognizes it as a designated number and stores it in the storage unit 120. The controller 100 can use the designated number as a multicast number for the multicast group in order to multicast a message.

Figure 6:
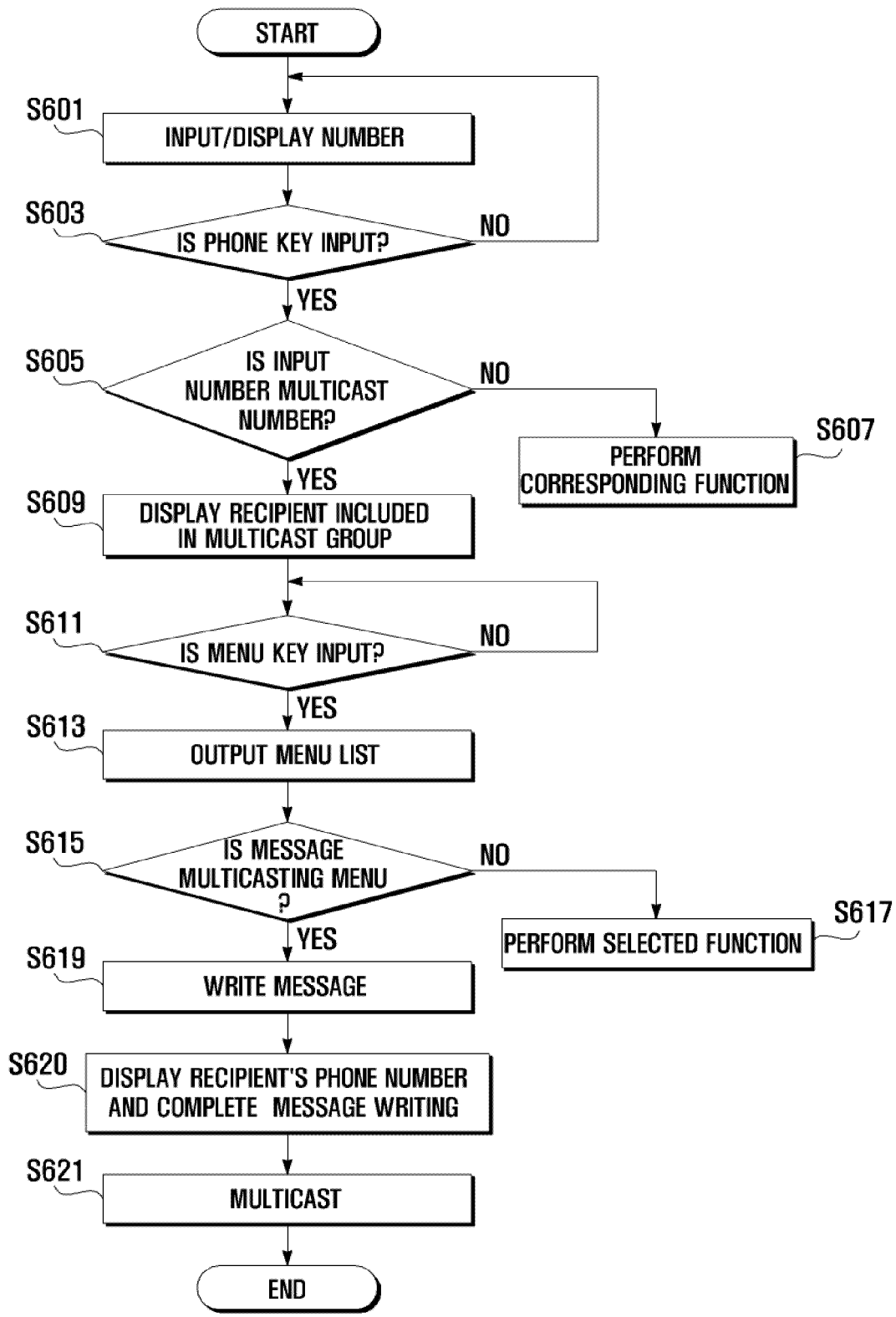
FIG. 6 is a flowchart illustrating a method for multicasting a message according to an exemplary embodiment of the present invention.

FIG. 6 is a flowchart illustrating a method for multicasting a message according to an exemplary embodiment of the present invention. FIG. 7A to FIG. 7D are views illustrating screens describing a method for multicasting a message using a representative number according to an exemplary embodiment of the present invention. FIG. 8A to FIG. 8D are views illustrating screens describing a method for multicasting a message using a designated number according to an exemplary embodiment of the present invention.

Referring to FIG. 6, FIG. 7A to FIG. 7D, and FIG. 8A to FIG. 8D, the controller 100 receives a number input through the input unit 130 and controls the display unit 110 to display the input number at step S601. The controller 100 may receive a wired phone number or a user's setting number through the input unit 130.

The controller 100 determines whether a phone book key is pressed through the input unit 130 at step S603. If the controller 100 does not receive a phone book key at step S603, it controls the display unit 110 to continue activating an input window for receiving a number at step S601.

In contrast, if the controller 100 receives a phone book key at step S603, it determines whether an input number is a number that is related to a representative number or a designated number at step S605. That is, the controller 100 compares the input number of the input unit 130 with a multicast number of the multicast group 124 stored in the storage unit 120 in order to determine whether the input number partially or entirely matches with a multicast number of a multicast group 124. For example, if the controller 100 determines that a wired phone number is input through the input unit 130, it searches for a multicast number that entirely matches with the wired phone number. If the controller 100 determines that a user's setting number is input, it searches for a multicast number that partially matches with the user's setting number.

If the controller 100 determines that that an input number is a multicast number at step S605, it controls the display unit 110 to display recipients that match with the input number, stored in the storage unit 120, and correspond to a multicast group 124, at step S609.

If the input number is a wired phone number '031-310-6306,' the controller 100 searches for recipients in the multicast group 124 that use a multicast number that entirely matches with the representative number '031-310-6306.' As illustrated in FIG. 7A, the controller 100 controls the display unit 110 to display the recipients in the multicast group 124, which use a multicast number '031-310-6306,' a father and a mother, and a certain phone number '010-3000-4567.'

If the input number is a user's setting number '1004,' the controller 100 searches for a multicast group 124 that uses a multicast number that partially matches with the designated number '1004.' As illustrated in FIG. 8A, the controller 100 controls the display unit 110 to display the recipients in the multicast group 124, which uses a multicast number '1004,' James and Gina, and a certain phone number '101-3000-4567.' In particular, if the input number is a multicast number through the input unit 130, the controller 100 also controls the display unit 110 to display the input number and the letter "G" to indicate that the input number has been already used to set the multicast group 124.

In contrast, if the controller 100 determines that that an input number is not a multicast number at step S605, the controller 100 performs a corresponding function at step S607. The corresponding function may be a process of displaying a menu for transmitting a general message to the input number or a process of generating a new multicast group. That is, the controller 100 may generate a multicast group to designate the input number as a multicast number. The controller 100 may also control the display unit 110 to display a message indicating that it is impossible to search for a multicast number matching with the input number.

The controller 100 determines whether a menu key for transmitting a multicast message is pressed through the input unit 130 at step S611. If the controller 100 determines that the menu key is pressed at step S611, it controls the display unit 110 to display a menu list at step S613)

If a message is intended to be multicast through a representative number, the controller 100 controls the display unit 110 to display a screen as illustrated in FIG. 7B. That is, the controller 100 controls the display unit 110 to display a menu list of '1 multicast message,' '2 search with consonant,' and '3 search with vowel.'

If a message is intended to be multicast through a designated number, the controller 100 controls the display unit 110 to display a screen as illustrated in FIG. 8B. That is, the controller 100 controls the display unit 110 to display a menu list of '1 multicast message,' '2 search with consonant,' and '3 search with vowel.'

In contrast, if the controller 100 does not detect that a menu key signal is not input at step S611, it controls the display unit 110 to continue displaying names of the searched recipients of a multicast group 124 and a certain phone number. The certain phone number is a phone number that a user input in a process of generating a multicast group 124.

The controller 100 determines whether an item, '1 multicast message,' for example, is selected from the menu list of '1 multicast message,' '2 search with consonant,' and '3 search with vowel,' which are displayed on the display unit 110, at step S615. The controller 100 can detect the input signal for selecting '1 multicast message' through the operation of the direction keys or the numerical keys of the input unit 130. If the controller 100 determines that a signal other than the signal for selecting '1 multicast message' is input at step S615, it performs a corresponding function at step S617.

If the controller 100 determines that an item, '1 multicast message,' for example, is selected from the menu list at step S615, it controls the display unit 110 to activate and display an input window for writing a message.

For example, if a message is intended to be multicast through a representative number, the controller 100 controls the display unit 110 to display a screen as illustrated in FIG. 7C. If a message is intended to be multicast through a designated number, the controller 100 controls the display unit 110 to display a screen as illustrated in FIG. 8C.

If the input number is a wired phone number, the controller 100 recognizes the wired phone number as a representative number in the process of generating a multicast group and stores it. If the input number is a user's setting number, the controller 100 recognizes the user's setting number as a designated number in the process of generating a multicast group and stores it. Therefore, the controller 100 can use the representative number and the designated number as a multicast number of a multicast group in order to multicast a message.

In the process of multicasting a message, the controller 100 can control the display unit 110 to first display recipients in the multicast group corresponding to a multicast number, and then to activate and display a message input window, according to the input signal of the input unit 130. Alternatively, the controller 100 can also control the display unit 110 to first activate and display a message input window and then to display recipients in the multicast group corresponding to a multicast number, according to the input signal of the input unit 130.

If the controller 100 determines that a message writing completion signal is input through the input unit 130 at step S619, it controls the display unit 110 to display a recipient's phone number of the multicast group 124 and a message indicating that a text message has been written at step S620.

For example, if a message is multicast through a representative number, the controller 100 controls the display unit 110 to display a screen as illustrated in FIG. 7D. That is, the controller 100 controls the display unit 110 to display recipients in a multicast group corresponding to a multicast number '031-310-6306,' such as a father and a mother, a certain phone number '010-3000-4567' included in the multicast group, and a message indicating that a text message has been written.

If a message is multicast through a designated number, the controller 100 controls the display unit 110 to display a screen as illustrated in FIG. 8D. That is, the controller 100 controls the display unit 110 to display recipients in a multicast group corresponding to a multicast number '1004,' such as James and Gina, a certain phone number '010-3000-4567' included in the multicast group, and a message indicating that a text message has been written.

The controller 100 detects a signal for multicasting a message, input through the input unit 130, and multicasts a message to recipients in the multicast group 124 through the RF communication unit 140 at step S621.

As described above, the method and apparatus, according to the present invention, can multicast a message in a portable terminal, using a wired phone number or a number set by a user, as a multicast number. Therefore, portable terminal users can easily and efficiently send the message to the recipients.

While the invention has been shown and described with reference to certain exemplary embodiments, it should be understood by those skilled in the art that various changes in form and details may be made therein without departing from the spirit and scope of the invention as defined in the appended claims and their equivalents.

What is claimed is:

1. A method for generating a multicast group in a portable terminal, the method comprising:
    inputting a number;
    searching in a phone book for recipients whose numbers partially or entirely match with the input number;
    selecting at least two recipients among the searched recipients; and
    generating a multicast group with the selected recipients; and
    wherein the input number is designated as a multicast number for selecting the generated multicast group.

2. The method of claim 1, wherein the input number comprises one of a wired phone number and a number set by a user.

3. The method of claim 2, wherein the generating of the multicast group further comprises setting the input number to a representative number, if the input number comprises a wired phone number.

4. The method of claim 2, wherein the generating of the multicast group further comprises setting the input number to a designated number if the input number comprises a number set by a user.

5. The method of claim 2, wherein the generating of the multicast group further comprises adding a certain phone number to the multicast group.

6. The method of claim 5, wherein the generating of the multicast group further comprises generating a multicast group using recipients, corresponding to the multicast number, and the certain phone number.

7. The method of claim 6, further comprising:
storing the generated multicast group and a multicast number corresponding to the multicast group.

8. The method of claim 1, further comprising:
inputting the multicast number;
multicasting a message to recipients' numbers, corresponding to a multicast group of the input multicast number.

9. The method of claim 1, further comprising:
inputting a certain number; and
indicating, if the input certain number is not designated as the multicast number, that the input certain number was not designated as a multicast.

10. A portable terminal comprising:
an input unit for inputting a number
a controller for searching for recipients whose numbers partially or entirely match with the input number in a phone book of the portable terminal, for selecting at least two recipients among the searched recipients, and for generating a multicast group with the selected recipients; and
wherein the input number is designated as a multicast number for selecting the generated multicast group.

11. The portable terminal of claim 10, further comprising:
a display unit for displaying a process of generating the multicast group.

12. The method of claim 10, wherein the input number comprises at least one of a wired phone number and a number set by a user.

13. The portable terminal of claim 12, wherein the controller sets the input number to a representative number if the input number comprises a wired phone number.

14. The portable terminal of claim 12, wherein the controller sets the input number to a designated number if the input number comprises a number set by a user.

15. The portable terminal of claim 10, wherein the controller includes an additionally input phone number in the multicast group.

16. The portable terminal of claim 10, further comprising:
a storage unit for storing the multicast group and the multicast number corresponding to the multicast group.

17. The portable terminal of claim 10, wherein the controller determines, if a certain number to multicast a message is input, whether the certain number is the multicast number previously designated in a phone book, and outputs, if the input certain number is the multicast number previously designated in a phone book, a list of a multicast group included in the multicast number.

18. The portable terminal of claim 17, wherein the controller outputs a message indicating that it is not possible to perform a search, if the input certain number is not designated as the multicast number.

* * * * *